United States Patent [19]
Zimmermann et al.

[11] Patent Number: 5,684,670
[45] Date of Patent: Nov. 4, 1997

[54] CONTROL SWITCH OR SIGNALING UNIT CONTROL PANEL MOUNTING ARRANGEMENT

[75] Inventors: Rudolf Zimmermann, Sulzbach-Rosenberg; Rainer Kreutzer, Weiden; Reinhard Herdegen, Amberg; Josef Birzer, Schwandorf, all of Germany

[73] Assignee: Siemens Aktiengesellschaft, München, Germany

[21] Appl. No.: 505,229

[22] PCT Filed: Feb. 9, 1993

[86] PCT No.: PCT/DE93/00106

§ 371 Date: Aug. 9, 1995

§ 102(e) Date: Aug. 9, 1995

[87] PCT Pub. No.: WO94/18731

PCT Pub. Date: Aug. 18, 1994

[51] Int. Cl.$^6$ .............................. H02B 1/04; H05K 5/00
[52] U.S. Cl. .................... 361/627; 200/296; 248/27.1
[58] Field of Search ........................... 200/293, 295, 200/296; 174/48; 248/27.1, 27.3; 361/627, 807, 837

[56] References Cited

U.S. PATENT DOCUMENTS 4,899,252  2/1990  Birzer ........................ 361/627

FOREIGN PATENT DOCUMENTS

| 2 188 716 | 1/1974 | France | H02B 1/04 |
| 0 019 740 | 3/1882 | Germany | F16L 39/02 |
| 77 12 822 | 7/1977 | Germany | H02B 1/08 |
| 31 45 070 | 6/1983 | Germany | G05G 1/02 |
| 0 330 956 | 9/1989 | Germany | H02B 1/04 |
| 91 09 678.2 | 1/1993 | Germany | H02B 1/044 |

OTHER PUBLICATIONS

Telemecanique Katalog G 01, Apr. 1975.

Primary Examiner—J. R. Scott
Attorney, Agent, or Firm—Kenyon & Kenyon

[57] ABSTRACT

A control switch with a holder is to be provided which can simply and quickly be secured by one person to a variable-thickness fitting plate. To this end the rose (9) of the control switch has a longitudinal groove (11) and a transverse groove (12). The holder which can be fitted on the rose (9) consists of a lower casing (14), a securing ring (5) and an upper casing (23). The lower casing (14) and the securing ring (5) have matching pitches (20, 6) so that when the securing ring (5) is rotated via a toothed spindle (7) fitted off-center it is axially shifted. After the holder has been fitted on the rose, when the securing ring (5) is rotated, a partial thread (18) fitted thereto is rotated out of the longitudinal groove (11) into the transverse groove (12) and thus pressed by the simultaneous axial movement of the partial thread (18) against the limiting edge of the transverse groove (12) taking the form of a thread segment (13). Slight rotary movements of the spindle (7) thus produce considerable travel of the pressure of the support, peritting rapid secuing to fitting plates.

16 Claims, 3 Drawing Sheets

CONTROL SWITCH OR SIGNALING UNIT CONTROL PANEL MOUNTING ARRANGEMENT

BACKGROUND OF THE INVENTION

The invention concerns a control switch and/or signaling unit with a collar or flange which has a cylindrical part, and with a holder.

Control switches and/or signaling units of this kind, which are mounted to a mounting hole of a fitting plate by means of a holder slid onto the collar, are known (see Télémécanique catalog G01, April 1975, e.g. model XBF-Z1). Here the holder has an opening with internal threads, and can be screwed onto the cylindrical part of the collar which is equipped with corresponding external threads. The holder also has a pressure plate, displaceable axially with respect to the cylindrical part, which is pressed against the fitting plate to mount the collar. This is done by means of a toothed ring which is rotatable by means of a shaft, mounted off-center, with corresponding teeth, and which is equipped with a helix segment. This rests at least partially on a further helix segment of a counterelement. The ring is displaced upon rotation, in accordance with the pitch of the helix segments, in the axial direction, carrying the pressure plate along. The actuator of the control switch is screwed, from the front, onto a holder introduced from the back through the opening of the fitting plate. One-person fitting of the control switch is therefore not possible if the fitting plate is a larger front panel.

It is also known, for the mounting of control switches, to join them to a holder by means of a slide lock fastener (see DE 77 12 822.4). Here again, retention of the actuator during fitting is required because of the rotational entrainment effect when the holder is snapped into place. A further disadvantage is the cumbersome adaptation to the thickness of the fitting panel, which according to DIN standards can vary from 1 mm to 6 mm. Adaptation is accomplished, from the back, by means of two screws located opposite one another on the edge of the holder. The two screws are screwed in, in alternating steps, until they press against the fitting panel. Because of the single-point pressure that this produces, it is possible with thin front panels, made for example of plastic, for an impression to be created or even for the fitting panel to be damaged. The same disadvantages also occur with control switches having snap connections, in which a holder with elastic snap elements is snapped into place (see EP 03 30 956 A1). Here again, the actuator must be retained during fitting so that it is not pushed out by the holder as it is snapped into place. Single-person fitting is equally impossible with the ring nut mounting method (also known) for control switches. Here again, the actuation element must be held from the front so the ring nut can be screwed on from the back for mounting purposes. Thin front panels require a protracted screwing-on operation, for which moreover a special socket wrench is usually required.

In the case of fitting from the front with snap lugs (see DE 31 45 070), lugs which press against the front panel under spring pressure are released by pressure or twisting after the actuator is pushed on. Here again, however, adapting to different front panel thicknesses requires considerable effort or is possible only to a limited degree.

Substantially improved control switch mounting is achieved by a holder according to Utility Model G 91 09 678.2. With this, the control switch and/or signaling unit can be quickly and simply fastened to a variable-thickness fitting plate by means of an opening present therein. This holder represents the most obvious prior art for the present invention, and will be described below for better understanding of the invention.

SUMMARY OF THE INVENTION

It is therefore an object of the invention to create a control switch and/or signaling unit of the aforesaid type that can be quickly and easily mounted to a variable-thickness fitting plate by means of an opening present therein.

The invention provides a control switch and/or signaling unit of the aforesaid type in which almost double the thickness of fitting plates can be covered, without additional parts, with the holder. This object is achieved with a control switch and/or signaling unit that includes control switch and/or signaling unit with a collar comprising: a cylindrical part having longitudinal groove, proceeding from which a transverse groove extends along its periphery; a holder having an opening adapted to the periphery of the cylindrical part; and including an externally rotatable spindle having teeth, a correspondingly toothed secured ring in engagement with said spindle; and a lower casing equipped with a first pressure surface; wherein narrow edge surfaces on both sides of the securing ring are each equipped with a first helix element; the lower casing has a second helix segment on its inner wall formed by the opening; the holder has an upper casing with a second pressure surface; the upper casing being equipped, on its inner wall formed by the opening, with at least one fourth helix segment; with the holder in the assembled state, the securing ring slides upon rotation, with its first helix segments, along the second and fourth helix segment of the lower casing and the upper casing, accompanied by axial displacement; the securing ring has on its inner wall formed by the opening a projection that, once the holder has been placed onto said cylindrical part via the longitudinal groove, can be rotated by twisting the securing ring into the transverse groove, accompanied by axial displacement with respect to the lower casing, until the first or second pressure surface is pressed, by the force exerted by the projection on a limiting edge of the transverse groove, against the fitting plate.

The control switch and/or signaling unit specified in this fashion is characterized by an easily and economically manufacturable mounting apparatus. Once the collar with the actuator has been inserted from the front of the fitting panel into the mounting hole in the fitting panel with a miniature interference fit, so that it cannot fall out under its own weight, the holder can be joined to the collar by sliding on with zero force. With this holder, a one-person fitting operation can be used for mounting. A further advantage of this holder is the fact that the as-removed state of the holder, i.e. the state after detachment of the holder, is the same as the state for fitting. An ordinary tool, specifically a screwdriver, is sufficient for fitting. By means of reversibility and axially off-center arrangement of the partial thread, this signaling unit makes possible almost a doubling of the range of fitting plate thicknesses that can be covered.

If the lower casing has, on its inner wall formed by the opening, a coupling element for engagement into the longitudinal groove, the holder can then, because of the guidance provided by the coupling element in the longitudinal groove, be easily slid onto the collar with the securing ring in the neutral position necessary for fitting.

An encapsulated version of the holder and a capability for easily detaching it are achieved if the holder has an upper casing with the opening, and the latter is equipped on its inner wall formed by the opening with a third helix segment;

and if there is provided on the securing ring a first helix segment that, for the purpose of detaching the holder by backward rotation of the spindle, slides along the third helix segment and thereby moves the securing ring axially backward.

If the projection is configured as a partial thread, and the limiting edge of the transverse groove facing away from the fitting plate as a second thread segment, this results in an additional travel upon rotation of the securing ring, exceeding the travel effected by the first and second helix segment. As a result a large travel is achieved by even slight rotation of the spindle, which allows quick mounting.

An extraordinary improvement in the control switch and/or signaling unit is achieved by the fact that the holder has an upper casing with a second pressure surface; that the upper casing is equipped, on its inner wall formed by the opening, with at least one fourth helix segment; that the securing ring has first helix segments on its narrow edge surfaces on both sides; and that with the holder in the assembled state, upon rotation of the securing ring the latter slides with its first helix segments, accompanied by axial displacement, along the second and fourth helix segment of the lower casing and the upper casing. With this embodiment, reversibility and axially off-center arrangement of the partial thread make possible almost a doubling of the range of fitting plate thicknesses that can be covered.

If the mutually contacting surfaces of the first, second, and fourth helix segments are configured as a V-shaped fit, this increases the friction, which allows a greater pitch for the helix segments while having sufficient self-locking.

An embodiment in which the first, second, and fourth helix segments have overhanging sloping steps yields the advantage that after the 180-degree rewinding of the securing ring resulting from reversal, the rotary motion for mounting purposes begins from a defined axial position. This prevents any accidental shift in the neutral position in which the coupling element and the partial thread are aligned.

It is also advantageous, if a screw tip projects from the first and/or second pressure surface of the holder, that greater protection against twisting of the holder can be achieved thereby.

BRIEF DESCRIPTION OF THE DRAWINGS

An embodiment of the invention is explained in more detail below with reference to the drawing figures described briefly below.

DETAILED DESCRIPTION

Figure 1:
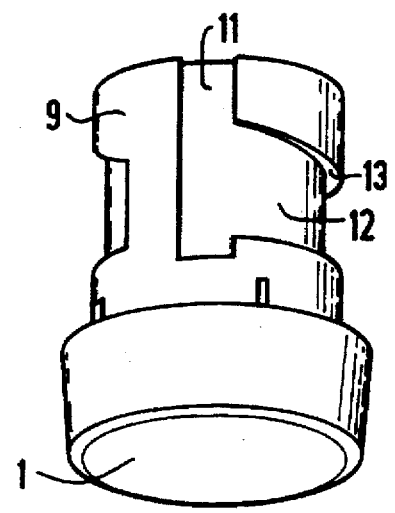
FIG. 1 shows a collar with front ring for mounting in an opening of a fitting plate.
Figure 2:
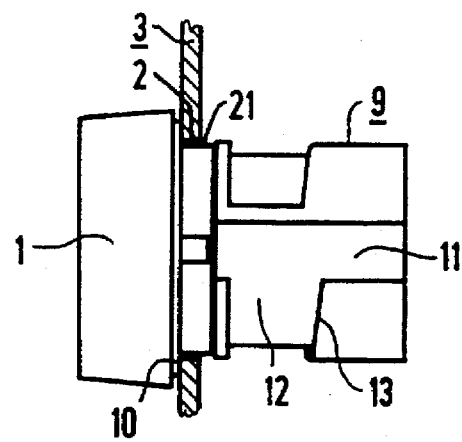
FIG. 2 shows the collar of FIG. 1 in the state as inserted in the opening of the fitting plate.

FIG. 1 depicts a collar 9 with a front ring 1 of a control switch and signaling unit, which is to be mounted by means of a mounting hole 2 of a fitting plate or front panel 3 according to FIG. 2. Collar 9 projects out from the back of fitting plate 3. It is configured as a tubular part with an outside diameter and equipped with at least one longitudinal groove 11 lying in the axial direction of mounting hole 2. Extending from the groove at the periphery of collar 9 is a transverse groove 12. The limiting edge of transverse groove 12 facing away from the fitting plate is inclined, and serves as a first thread segment 13.

Figure 7:
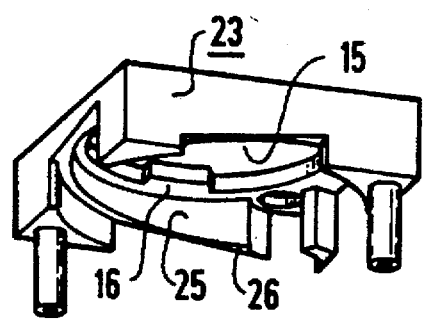
FIG. 7 shows the upper casing of the holder.
Figure 6:
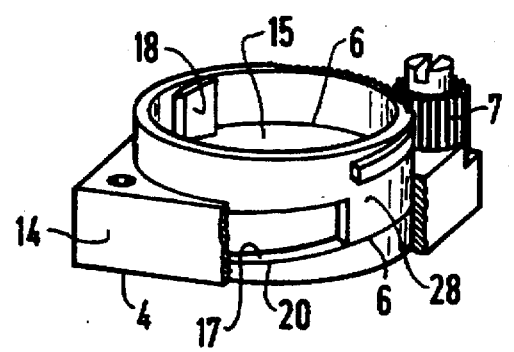
FIG. 6 shows the lower casing, the securing ring, and the spindle according to FIGS. 3, 4, and 5, in the assembled state.
Figure 5:
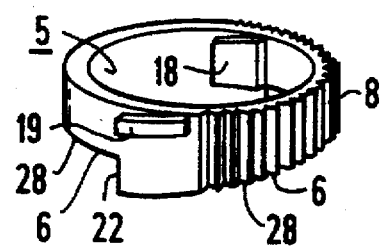
FIG. 5 shows a securing ring.
Figure 4:
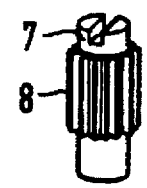
FIG. 4 shows a spindle.
Figure 3:
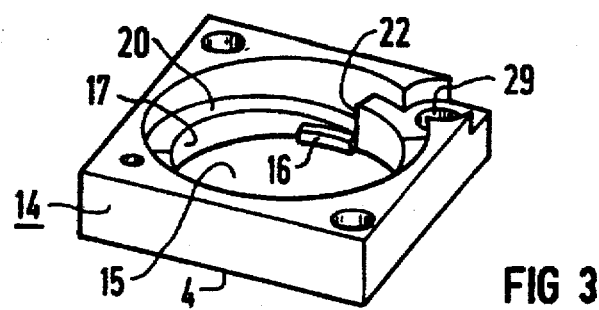
FIG. 3 shows a lower casing of a holder.

The components depicted in the following figures together constitute a holder with an opening 15, which can be placed onto collar 9. FIG. 3 shows lower casing 14 thereof with opening 15, the inside diameter of which is matched to the outside diameter of collar 9. Lower housing 14 has on the inner wall formed by its opening 15, in addition to a coupling element 16, two helix segments 17. These ascend at a pitch 20. A drilled hole 29 is provided off-center to receive a toothed spindle 7 according to FIG. 4. FIG. 5 shows a securing ring 5 with teeth 8 on its outer periphery which are matched to the teeth of spindle 7 according to FIG. 4 for meshing operation therewith. In a first exemplary embodiment according to FIG. 5, the top of securing ring 5 is flat. The underside, however, has two helix segments 28 with a pitch 6 that corresponds to pitch 20 of helix segments 17 of lower casing 14. Securing ring 5 has, on its inner wall formed by opening 15, a projection in the form of a partial thread 18. A first thread segment 19 is located on the periphery of securing ring 5, the helix segments 28 of which are each equipped with a step 22 serving as a stop. FIG. 6 shows the components just described in the assembled state, in which helix segments 28 and helix segments 17 are in contact with one another and the top of securing ring 5 forms the flat termination. Forming part of this unit is an added-on upper casing 23 according to FIG. 7. This has, on its inner wall formed by opening 15, helix segments 25 with a pitch 26. Also present on this inner wall is a coupling element 16 which can be omitted in the specific embodiment in which coupling element 16 is provided on the inner wall of lower casing 14 according to FIG. 3.

The control switch is mounted onto fitting plate 3 with the following steps:

Collar 9 with front ring 1 of the control switch is inserted, from the front, into mounting hole 2 of fitting plate 3 with a miniature interference fit 21 as in FIG. 2. This prevents collar 9 with front 1 from falling out under its own weight. The holder is then pushed in a zero-force manner onto collar 9 from the back of fitting plate 3, the holder being guided by coupling element 16 and partial thread 18 in longitudinal groove 11. The holder is prevented from twisting by the engagement of coupling element 16 in longitudinal groove 11. For this purpose, longitudinal groove 11 must extend out beyond transverse groove 12 if coupling element 16 is provided in the inner wall of the lower casing. During fitting, coupling element 16 and partial thread 18 are aligned in the axial direction of mounting hole 2. Since holding forces are required only for the weight of the control switch, and can easily be applied by ribs, bosses, elastomer, or the like, this allows "one-person assembly." The holder can be oriented as to angle before or during tightening. The holder is tightened by a few right-hand turns of spindle 7, located off-center, which can be operated with an ordinary screwdriver. The spindle turns securing ring 5—which acts on collar 9 by means of partial thread 18 and oppositely oriented helix segment 28, and behind thread segment 13—via teeth 8, and also itself moves in the holder casing away from fitting plate 3 and thus presses the holder with its first pressure surface 4 against fitting plate 3.

The maximum possible travel is thus achieved with a minimum rotation angle. Rotational entrainment torque is absorbed by the coupling between the control switch and the holder casing in the aforesaid longitudinal groove 11, so there is absolutely no tendency to twist during tightening. The correct neutral position of securing ring 5 required for fitting, and therefore the alignment of coupling element 16 with partial thread 18, are achieved by means of step 22, which pushes against further stop 22 on lower casing 14, serving as a stop, as spindle 7 is turned to the left. Axial retraction of securing ring 5 upon removal of the holder is effected by second thread segment 19 of the securing ring, which engages with helix segment 25, with pitch 26, of upper casing 23.

The travel of the holder is produced by axial displacement of the securing ring, and thus also of its partial thread 18, as a result of rotation, and also by the limiting edges of transverse groove 12, configured as thread segment 13, with which partial thread 18 engages. In a simplified embodiment a rectangular, straight projection is provided instead of partial thread 18, and the limiting edge of transverse groove 12 is not configured as a thread segment 18 but rather extends in a straight line. This embodiment, however, yields a travel resulting only from the pitch of securing ring 5 in combination with lower casing 14.

The placement of thread segment 19 close to the edge of securing ring 5 minimizes the overall height of the holder. The holder is manufactured, in easily assembled fashion, by successive vertical introduction of the individual parts.

Fitting of the complete control unit is accomplished with the greatest possible reliability, since the snug fit against the back of the front panel eliminates jamming or skewing of the holder as well as potential incomplete snapping into place.

When the holder just described is used for the mounting of switches, the pitch of the thread segments and thus the range of fitting plate thicknesses that can be covered is limited by the required self-locking on the oblique surfaces.

Figure 10:
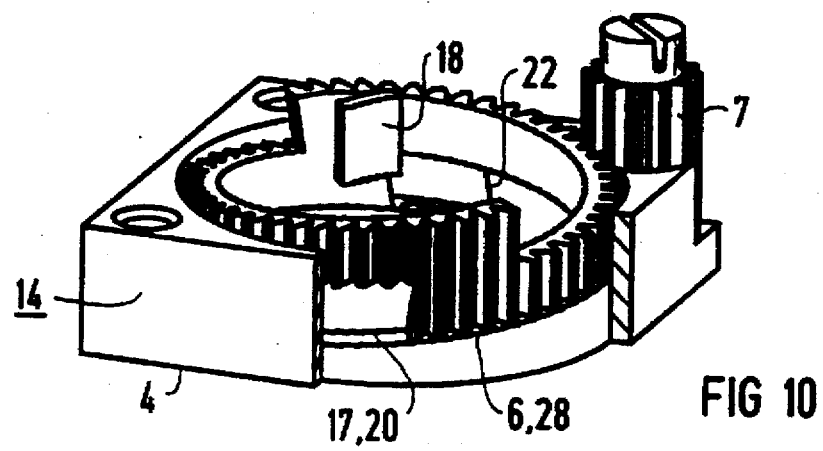
FIG. 10 shows the lower casing with retention of the reversible holder.

In the control switch and/or signaling unit, the holder has an upper casing 23 that is equipped with two helix segments 30 with pitch 20. These are completely identical to helix segments 17 of the corresponding lower casing 14 (see FIGS. 8 and 10). Matching them, securing ring 5 has respective helix segments 28 with pitch 6, as depicted in FIG. 9. The off-center arrangement of partial thread 18 on securing ring 5 results in a rotating holder with which a greater fitting plate thickness can be covered. Depending on the thickness of fitting plate 3, the holder makes contact by means of pressure surface 4 of lower casing 14 or, with the holder reversed, by means of a second pressure surface 31 of upper casing 23 (see FIG. 8).

Overhanging sloping steps 22 of helix segments 17, 28, 30 on securing ring 5 and on upper casing 23 and on lower casing 14 make it possible, after the 180-degree rewinding of securing ring 5 resulting from reversal, to begin the turning motion for mounting from a defined axial position. This prevents any accidental shift in the neutral position in which coupling element 16 and partial thread 18 are aligned.

Figure 8:
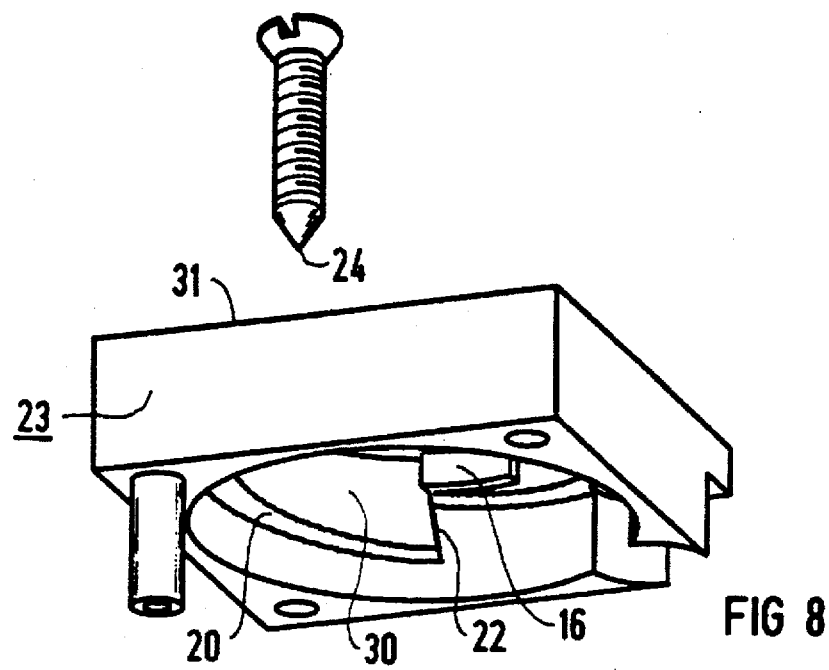
FIG. 8 shows the upper casing of a reversible holder.
Figure 9:
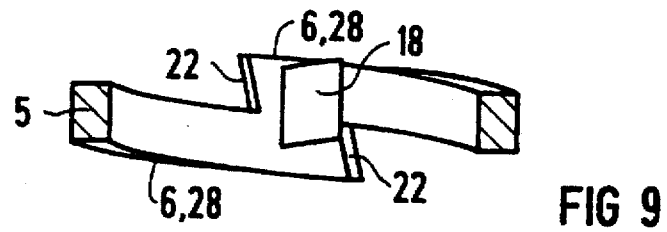
FIG. 9 shows the securing ring of a reversible holder of FIG. 8, in section.

Additional protection against twisting of the holder is achieved by means of two screw tips 24, mounted in opposite directions, which project slightly from pressure surfaces 4, 31 of lower casing 14 and upper casing 23, as indicated for example in FIG. 8, and press positively into the back of fitting plate 3.

As a result of the improved mounting apparatus, the control switch described above can be quickly and reliably mounted to a fitting plate by a single person.

What is claimed is:

1. A panel-mounted unit for mounting in a mounting hole of a fitting plate and having a collar, comprising:
   a) a cylindrical part having a longitudinal groove, proceeding from which a transverse groove extends along its periphery; and
   b) a holder having an opening, the cylindrical part being insertable into the opening of the holder, the holder including
      i) an externally rotatable spindle having teeth,
      ii) a correspondingly toothed securing ring in engagement with said spindle, and
      iii) a lower casing having a first pressure surface for coupling to the fitting plate;
   c) wherein, the narrow edge surfaces on both sides of the securing ring are each equipped with a first helix segment;
   d) the lower casing has a second helix segment on its inner wall formed by the opening;
   e) the holder has an upper casing which includes a second pressure surface;
   f) the upper casing being equipped, on its inner wall formed by the opening, with at least one third helix segment;
   g) with the holder in the assembled state, the securing ring slides upon rotation, with its first helix segments, along the second and third helix segment of the lower casing and the upper casing, accompanied by axial displacement;
   h) the securing ring has on its inner wall formed by the opening a projection that, once the holder has been placed onto said cylindrical part via the longitudinal groove, can be rotated by twisting the securing ring into the transverse groove, accompanied by axial displacement with respect to the lower casing, until the first or second pressure surface is pressed against the fitting plate, by the force exerted by the projection on a limiting edge of the transverse groove.

2. The panel-mounted unit of claim 1, wherein said projection is located off-center between the axially opposite helix segments.

3. The panel-mounted unit of claim 1, wherein mutually contacting surfaces of the first, second, and third helix segments are configured as a V-shaped fit.

4. The panel-mounted unit of claim 2, wherein mutually contacting surfaces of the first, second, and third helix segments are configured as a V-shaped fit.

5. The panel-mounted unit of claim 1, wherein said first, second, and third helix segments have overhanging sloping steps.

6. The panel-mounted unit of claim 2, wherein said first second, and third helix segments have overhanging sloping steps.

7. The panel-mounted unit of claim 3, wherein said first, second, and third helix segments have overhanging sloping steps.

8. The panel-mounted unit of claim 4, wherein said first, second, and third helix segments have overhanging sloping steps.

9. The panel-mounted unit of claim 1, wherein a screw tip projects from at least one of the first pressure surface and the second pressure surface.

10. The panel-mounted unit of claim 2, wherein a screw tip projects from at least one of the first pressure surface and the second pressure surface.

11. The panel-mounted unit of claim 3, wherein a screw tip projects from at least one of the first pressure surface and the second pressure surface.

12. The panel-mounted unit of claim 4, wherein a screw tip projects from at least one of the first pressure surface and the second pressure surface.

13. The panel-mounted unit of claim 5, wherein a screw tip projects from at least one of the first pressure surface and the second pressure surface.

14. The panel-mounted unit of claim 6, wherein a screw tip projects from at least one of the first pressure surface and the second pressure surface.

15. The panel-mounted unit of claim 7, wherein a screw tip projects from at least one of the first pressure surface and the second pressure surface.

16. The panel-mounted unit of claim 8, wherein a screw tip projects from at least one of the first pressure surface and the second pressure surface.

* * * * *